April 6, 1971     B. S. BOGART     3,573,888
VAPOR OVERHEATING METHOD AND APPARATUS FOR STRENGTHENING GLASS
Filed Feb. 6, 1968     2 Sheets-Sheet 1
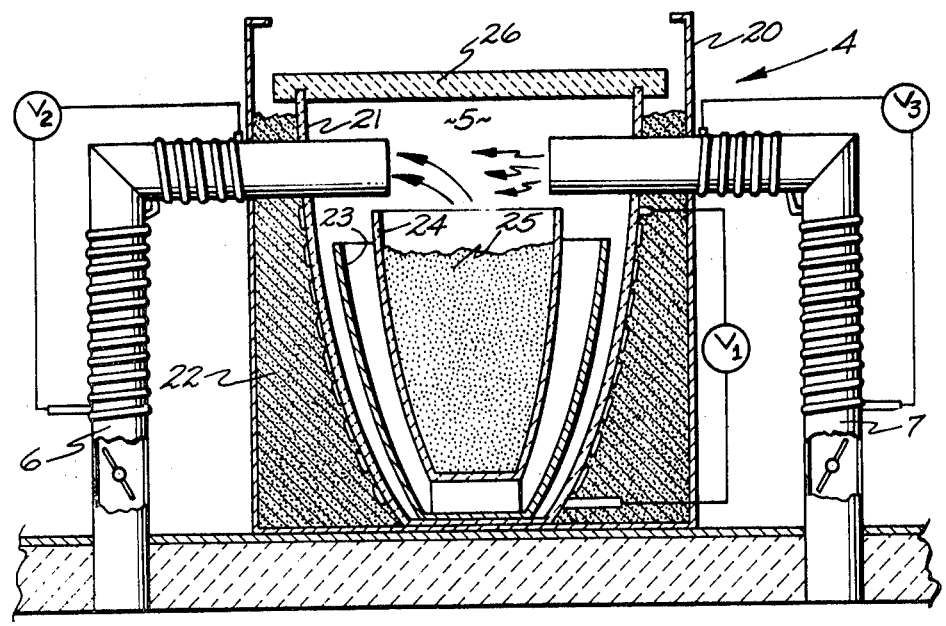
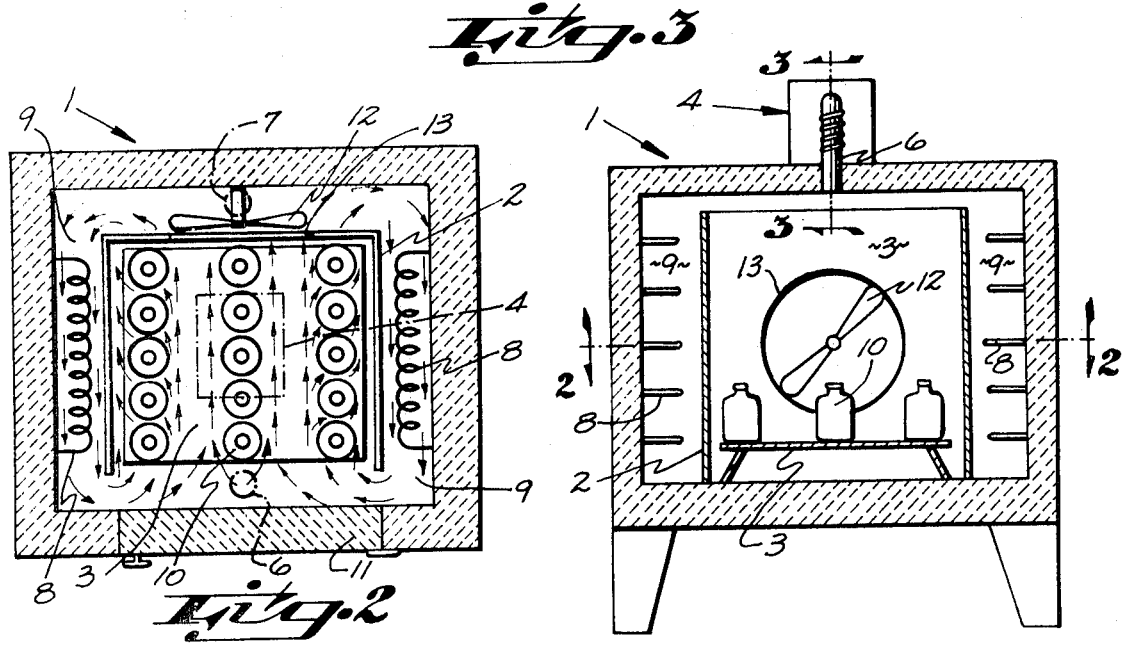
INVENTOR.
Burton S. Bogart
BY Wood, Herron & Evans
ATTORNEYS

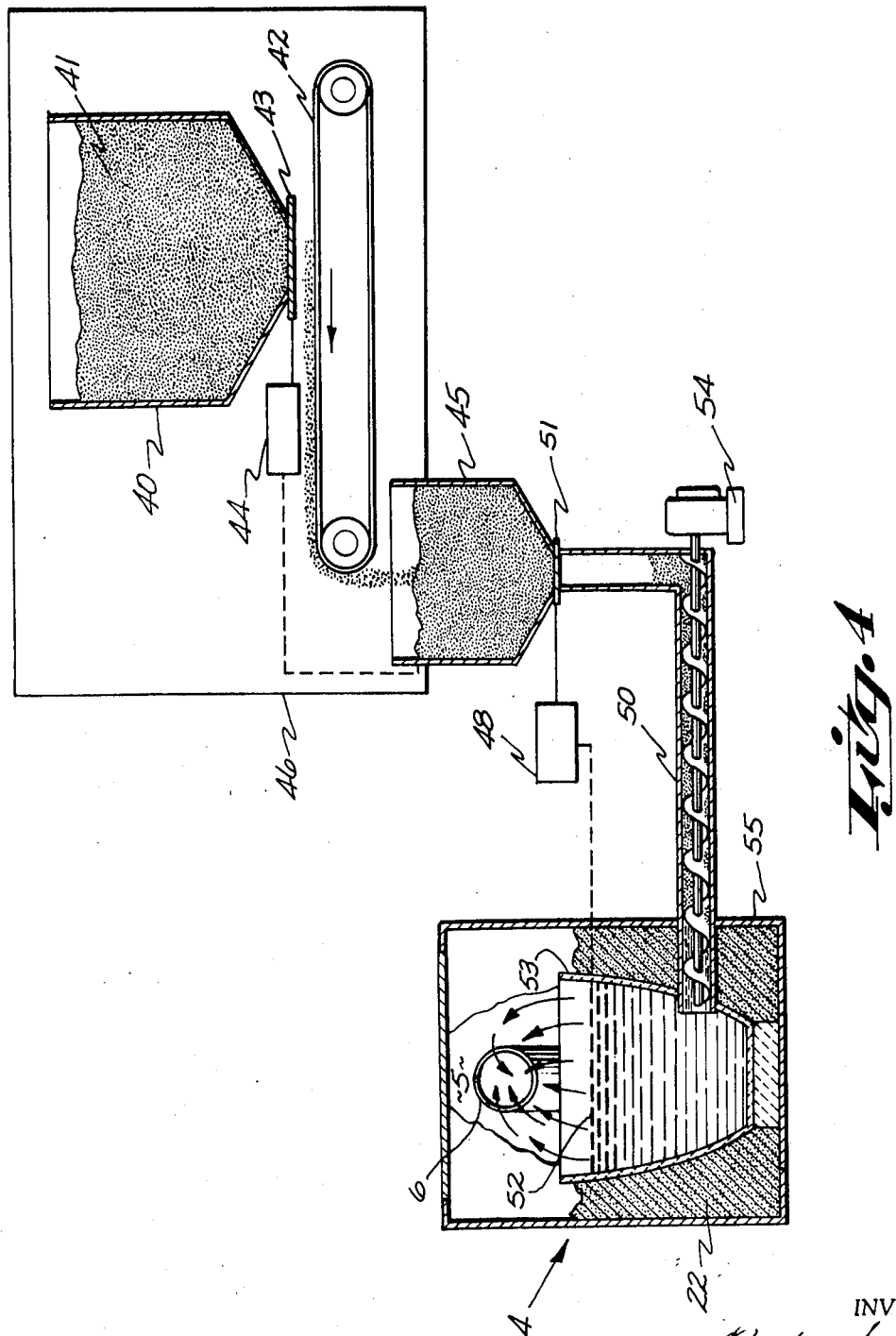

United States Patent Office 3,573,888
Patented Apr. 6, 1971

3,573,888
VAPOR OVERHEATING METHOD AND APPARATUS FOR STRENGTHENING GLASS
Burton S. Bogart, Lancaster, Ohio, assignor to Anchor Hocking Glass Corporation, Lancaster, Ohio
Filed Feb. 6, 1968, Ser. No. 703,455
Int. Cl. C03c 21/00
U.S. Cl. 65—30    14 Claims

ABSTRACT OF THE DISCLOSURE

In the strengthening of glass articles by exposure at elevated temperature to a metal compound in the vapor state, the vapor is overheated, in a zone spaced from the article, to a temperature substantially higher than that at which the article is maintained in the treating zone. Non-gaseous or condensed droplets entrained in the vapor are removed, and as the vapor is conducted or circulated into proximity with the article, the vapor temperature is reduced to approximately the temperature of the article to be treated. Apparatus is provided for automatically charging a source of the metal compound to a zone separate from the treating furnace, vaporizing it and overheating the vapor, conveying the vapor at controlled temperature and discharging it into the treating zone.

---

This invention relates to improvements in glass strengthening techniques of the type wherein the glass article, while heated, is exposed to a metal compound vapor which diffuses or supplies metal cations into a surface layer of the glass article. Specifically the invention relates to an improved method and apparatus for supplying the metal compound in the vapor state, to which the glass article is to be exposed.

Several recently developed techniques for strengthening glass articles include as a main step the exposure of the article, at elevated temperature, to vapor of one or more metal compounds. According to one such technique compounds of the metal lithium are used, such as lithium bromide, lithium chloride, lithium sulfate and lithium amide. At the temperature cycles employed, these lithium compounds, when vaporized, provide lithium cations which migrate a short distance into the glassy network underlying the surface of the article and displace or replace sodium ions therein. Such surface enrichment with lithium and depletion of sodium establishes a glass composition in the affected surface layer which is different than the essentially unchanged composition of the interior of the article. As a result the lithium ion-enriched surface layer demonstrates a different coefficient of thermal expansion than the interior of the body, and by proper treatment the surface layer can be placed in compression to strengthen the glass object as a whole.

In another vapor phase strengthening technique, the article is maintained at a temperature below its annealing point while being exposed to lithium hydroxide in the vapor state. In that method it is believed that molecules of LiOH migrate into the glass surface, thereby "crowding" or "packing" it and imparting a compression stress.

In still other techniques, articles can be exposed to vapors of cuprous compounds such as cuprous chloride, cuprous bromide, and cuprous iodide which form a surface layer by ion exchange that is compositionally different than the interior, and which can be placed in compression upon cooling.

In such strengthening methods the rate of diffusion from the vapor into the glass network depends upon and varies with the concentration of the treating gas. In general, within the acceptance capability of the glass, higher concentrations of the treating vapor effect more rapid diffusion. Thus, by increasing vapor concentration greater reaction rates can be achieved in a given exposure period.

Many of the metal compounds which are potentially useful have low vapor pressures over the most useful range of temperatures at which the glass articles can be exposed. In many instances the temperature range to be used is so low that the concentration of metal vapor in the atmosphere is very low.

For example, articles made of soda-lime glass compositions, such as most glass containers, window glass, etc., are strengthened through exposure to LiOH vapor at temperatures as low as 800–900° F. In such cases the rate at which strain is released from the article limits the maximum temperature which can be used. In other instances, as in strengthening with $Li_2SO_4$ or CuCl, maximum treating temperature is limited by softening of the glass. Excessive temperature may cause undesirable deformation of the article at temperatures above 1100–1200° F., depending on the shape of the article.

The melting and boiling points and the comparative vapor pressures of some compounds which can be used in such treating processes are as follows:

| Treating compound | Melting point, °F. | Temp. at which vapor pressure is 1 mm. Hg | Temp. at which vapor pressure is 10 mm. Hg | Boiling point |
| --- | --- | --- | --- | --- |
| LiOH | 842 | | | |
| LiCl | 1,137 | 1,441 | 1,710 | 2,467 |
| LiF | 1,547 | 1,917 | 2,212 | 3,050 |
| CuCl | 792 | 1,015 | 1,296 | 2,492 |
| LiBr | 1,017 | 1,378 | 1,630 | 2,310 |
| $Li_2SO_4$ | 1,580 | | | |
| CuBr | 940 | 1,062 | 1,324 | 2,453 |

From the table it is apparent that most of the listed compounds are well below their boiling points, and do not even have vapor pressures of 1 mm. Hg at the treating temperatures used. Because of such low vapor pressures, relatively long exposure periods have been used with low vapor pressure compounds in order to achieve desired large strength improvements.

One technique which has been used to increase the concentration of the treating vapor has been to place a large or bulk quantity of the powdered compound right in the treating zone. In some cases two and even four separate containers of the compound have been charged into the treating chamber; in other cases even the entire floor of the treating chamber has been covered with the compound to be vaporized. Such methods of overcoming the effect of low vapor pressure leave something to be desired from the standpoint of practicability and economics in commercial production, especially on a continuous basis.

Moreover, control of vapor concentration is difficult because the vapor is often not at its equilibrium pressure with respect to the source; that is, the atmosphere is not saturated. Thus, where the equilibrium vapor pressure at a given exposure temperature may be, say 1 mm., the actual vapor partial pressure may be much less, and may change as the supply diminishes. Hence reproducibility is affected.

The cuprous compounds, and the lithium compounds to a lesser degree, also exhibit a tendency to "sputter" in volatizing, or to condense, and liquid and/or solid particles of the compound sometimes become entrained in the vapor. Where such particles condense or fall out onto the surface of the article being treated, they may cause specking or local discoloring of the article and produce a non-uniform surface layer. In most cases their presence in the treated article locally reduces strength, and they may constitute focal points for fracture.

I have found that larger and/or more reproducible or consistent strength improvements can be obtained with a given exposure period and thermal cycle, and specking can be avoided, if the treating vapor is generated in a controlled zone spaced or remote from the zone in which the articles are to be treated, and if the vapor is "overheated" or heated to a temperature higher than the article surface temperature prevailing in the treating chamber but below the range at which the vapor decomposes, and if the vapor is conducted or conveyed to the treating zone while allowing any entrained particles to be condensed or to settle out and is cooled in the treating zone to approximately the temperature of the surface of the heated article.

I prefer to "overheat" 100° F. or more above the article temperature. I have further found that vapor generating temperatures of at least about 1200° F. enable the most significant improvements to be made.

The invention can best be further described by reference to the accompanying drawings, in which:

FIG. 1 is a vertical section through a glass treating furnace provided with a separate vapor generating furnace in accordance with a preferred form of this invention for strengthening articles on a batch basis;

FIG. 2 is a somewhat diagrammatic horizontal section taken on line 2—2 of FIG. 1, and illustrates the circulation of vapor within the treating zone;

FIG. 3 is an enlarged section of the vapor generating furnace, taken on line 3—3 of FIG. 1; and FIG. 4 is a somewhat diagrammatic vertical section of apparatus for automatically maintaining a constant supply in the vapor generating furnace of the material being vaporized.

In FIGS. 1 and 2, a glass oven is designated by 1, and has a three-sided partition 2 within it which defines an interior article treating zone 3. A separate, smaller vapor generating furnace is designated at 4 and provides a vapor generating zone 5. As shown in FIG. 1, it is convenient (but not necessary) to mount the vapor generating furnace 4 directly on top of the glass oven 1. Conduits or tubes 6 and 7 lead between the vapor generating space 5 of furnace 4 and the front and rear respectively of oven 1.

Glass oven 1 may be of the Trent oven type, and is heated by suitable means such as resistance heating elements indicated diagrammatically at 8, mounted in the spaces 9 between the refractory walls of the furnace and the liner 2. The articles 10 to be treated are shown in the drawing as comprising conventional 12 oz. non-returnable amber beer bottles, and are placed on a rack or shelf within the treating zone 3, being loaded therein through the furnace door 11. Line 6 discharges into the front of zone 3, and a fan 12 at the rear of the furnace draws vapors through an opening 13 in the back wall of partition 2 and returns the vapors to the front over the heater coils 8 in the spaces 9, as indicated by the arrows. Line 7 comprises an outlet or return line to the vapor generating space 5.

The vapor generating furnace 4 may take a number of embodiments and is shown as a simple but effective construction which includes an outer metal casing or box 20 in which a refractory crucible 21 is placed and insulated from the casing 20 by a sand bed 22. Crucible 21 is wound with a resistive heater element such as Nichrome wire which is connected to a source of voltage controlled by a Variac designated as $V_1$. Inside the crucible 21 an alumina crucible 23 is placed to contain splatter, etc. from a third crucible 24 within it, in which a bed or source 25 of the metal compound is placed. Crucible 21 is provided with an air tight cover 26, which can be removed for charging the compound 25 into crucible 24. Conduits 6 and 7 are preferably made of a refractory material such as porcelain, and lead through box 20 and the wall of crucible 21 into vapor space 5 above the surface of compound 25. Each conduit is heated by a resistive winding and preferably has a separate independent source of voltage control such as the Variacs shown which are designated as $V_2$ and $V_3$ respectively. The tubes can be provided with flow regulators such as the dampers shown.

It should be noted that the vapor does not necessarily have to be generated from a bulk supply in the vaporizing chamber. For example, it is contemplated that a liquid solution of the metal compound could be sprayed at a regulated rate into chamber 5 so as to be volatilized from the spray rather than from a bulk source. Alternatively, particulate, fritted, or pelletized material can continuously be supplied to the zone, as shown in FIG. 4 described hereinafter. It may also be desirable to provide flow metering means for regulating the air flow through the vaporizing zone or in the line leading to the treating zone.

The particular oven 1 shown in the drawing for purposes of illustration is a batch type oven in which the articles to be treated are loaded and removed from the furnace on a batch basis, through the door 11. Vapor generating apparatus in accordance with this invention is also suitable for use in connection with a continuous treating furnace, for example with a continuous lehr wherein the articles to be treated are placed on a moving belt and are conveyed automatically from a cooler region into a heated zone into which the vapor is injected and wherein the exposure takes place.

It should also be understood that it is not necessary to use a vapor generating furnace which is entirely separate and remote from the chamber or zone wherein the articles are exposed to the vapor. More broadly, the concept of this invention encompasses vaporizing the treating material in a zone whether or not it is a separately enclosed chamber, but which is maintained at higher temperature conditions, then conducting or circulating the vapor from that zone into a treating zone which may be remote or contiguous with the vaporizing zone but which, in any event, is maintained at lower temperature conditions. For example, this may be accomplished in a single furnace having spaced separately heated zones the temperatures in which can be regulated independently of those in adjacent zones.

The spacing of the vapor generating zone from the treating zone, including line 6, provides a region wherein entrained particles will precipitate or condense and drop out of the stream, so that they do not impinge on the article. Removal of such particles has been found to afford better uniformity of strength in the treated articles, more uniform clarity and/or coloration, and to prevent local weakness. The effect is especially marked when treating with cuprous compounds, which can form saturated or even supersaturated vapors in cooling from the higher temperature of vaporization to the lower temperature in the treating zone. Use of a vaporizing zone which is of small volume in relation to the treating zone has also been found useful in controlling this problem.

The following examples demonstrate the improved method of the invention.

EXAMPLE 1

Apparatus of the type shown in the drawing was used in the strengthening of amber soda-lime bottles with CuCl vapor. The bottles had the calculated composition.

| Component: | Wt. percent |
|---|---|
| $SiO_2$ | 71.66 |
| $Na_2O$ | 14.82 |
| $Al_2O_3$ | 1.95 |
| CaO | 7.35 |
| MgO | 3.53 |
| BaO | 0.21 |
| MnO | 0.01 |
| $Fe_2O_3$ | 0.243 |
| S | 0.217 |

Crucible 24 was charged with 100 grams of powdered CuCl, and the vaporizing furnace 4 was heated to a temperature of 1250–1260° F., as measured by a thermocouple placed directly above the surface of the CuCl in crucible 24. Variacs $V_2$ and $V_3$ were set to provide temperatures in tubes 6 and 7 of about 1200–1225° F.

While the vaporizing furnace was heating up, the oven 1 was turned on and set to a temperature of 1150° F. Furnace heat-up to set point required 200 minutes. The start of furnace heat-up was taken as time zero.

Several bottles were preheated to 1050° F. in a pit furnace, and were transferred to treating chamber 3 at about 220 minutes after the run start. At that time the temperature in treating zone 3 was about 1150° F.

The cuprous chloride was vaporized at the prevailing temperature in the overheating furnace 4. At that temperature the vapor was rich in CuCl, and precipitation of non-vaporized droplets occurred with cooling in line 6. The vapors were circulated in the treating chamber 3 by fan 12, and returned to chamber 5 via line 7. The vapor entering chamber 3 was substantially saturated with CuCl. Since some vapor is consumed by diffusion into the glass bottles 10, and by condensation onto cooler furnace wall areas, makeup vapor is supplied from source 25. The supply of CuCl was replenished 180 minutes after the start of the run by adding an additional 25.0 grams of CuCl to crucible 24. This was repeated at 248 minutes after run start.

At 283 minutes after the run start, or 63 minutes of bottle exposure time, crucible 24 was removed from the vaporizing furnace 4, and both furnaces 1 and 4 were turned off and oven door 11 was partially opened. The bottles 10 cooled to room temperature in furnace 1 over a period of about 180 minutes.

After cooling the bottles were tested to determine the magnitude of the strength increase which had been effected. This was done on a standard internal pressure tester manufactured by American Glass Research, Inc. The bottles were filled with water and connected to a source of hydraulic pressure by which the internal pressure could be increased in controlled increments. Testing started at a pressure and hold time equivalent to 100 p.s.i. for one minute, then was increased in amounts of 12 p.s.i. and later 25 p.s.i. up to a maximum at each pressure level, until the bottle burst. If the bottle did not break at the pressure equivalent to 550 p.s.i. at a one minute hold period, the value of 550 p.s.i. was used to calculated the average strength. The average bursting pressure for the several bottles treated was 431 p.s.i. This compares with a bursting pressure of only 215 p..i. for similar but untreated bottles, or better than a 100% improvement.

EXAMPLE 2

Especially high strengths are obtained if the articles are not exposed to the vapor until they have been preheated above the annealing point. This is demonstrated by a run at conditions similar to those of Example 1, except that the bottles were placed in the furnace at start up and heated in contact with the vapor. The bottles so treated had an average bursting pressure of 417 p.s.i., as compared to the 431 burst pressure achieved in Example 1. The lower strength resulted even though the bottles had been exposed over a much longer period (about 283 minutes as compared with 63 minutes for the bottles in Example 1).

EXAMPLE 3

The method and apparatus of this invention makes possible the use of smaller quantities of the treating material to achieve desired results.

Bottles treated in the apparatus described in Example 1 were exposed to CuCl vapor for 30 minutes at 1150° F. The vapor source in the vaporizing zone was a single crucible, held at 1380° F. The treated bottles had an average bursting pressure of above 430 p.s.i. In comparison, when similar bottles were exposed at 1150° F. for 30 minutes with two crucibles of CuCl right in the treating zone, their strength was only about 400 p.s.i. Use of large quantities of the vapor supplying material in the treating chamber increases danger of specking and non-uniformity of product, and may increase material costs.

EXAMPLE 4

Glass rods were strengthened through exposure to vapor of dry $LiNH_2$. The rods were of very uniform cross-section and had the analysed composition:

| | Percent wt. |
|---|---|
| $SiO_2$ | 67.94 |
| $Na_2O$ | 15.82 |
| $K_2O$ | 0.48 |
| $Al_2O_3$ | 2.85 |
| $B_2O_3$ | 1.69 |
| $Fe_2O_3$ | 0.035 |
| BaO | 2.05 |
| CaO | 5.53 |
| MgO | 3.75 |
| $Li_2O$ | Trace |
| $TiO_2$ | 0.023 |
| $SO_3$ | 0.25 |

In this example the furnace used was a tubular furnace having separate zones. The temperature of each zone was independently controllable. The samples were placed in one zone and heated to 1100° F. In separate runs the vaporizing zone was heated to different temperatures to demonstrate the effect of vapor overheating on abraded tensile strength. A porcelain boat containing preheated $LiNH_2$ was placed into the vapor generating zone when the latter reached desired temperature.

An atmosphere of dry nitrogen was passed through the furnace to convey the vapor to the treating zone and to sweep out water vapor. In each case the rods were exposed for 10 minutes after which the source of $LiNH_2$ was removed and the rods were cooled.

In this experiment, the results indicated that for equal treating times, the higher the temperature of the vaporizing zone, the better the strength of the rods:

| Temperature of vaporizing zone, ° F. | Temperature of treating zone, ° F. | Exposure time, min. | Abraded strength, p.s.i. |
|---|---|---|---|
| 1,400 | 1,100 | 10 | 45,300 |
| 1,200 | 1,100 | 10 | 42,400 |
| 1,100 | 1,100 | 10 | 33,500 |
| 1,000 | 1,100 | 10 | 24,700 |

The strength of the untreated rods was 20,000 p.s.i.

EXAMPLE 5

In some strengthening methods it is desirable to treat the articles below the annealing point and at relatively low temperatures, for example about 900° F. This is done where LiOH vapor is employed, for example, or where $LiNH_2$ is used under conditions which convert it to LiOH. The vapor pressure of LiOH at that temperature is quite low, and it is difficult to achieve vapor equilibrium if the source is in the treating zone. This can be overcome if the vapor is overheated in accordance with this invention.

Glass rods of the type described in Example 4 were heated to 900° F. in the treating zone. A source of $LiNH_2$ was preheated to a temperature of 1100° F. and was then placed in the vaporizing zone at a temperature of 1100° F. for an exposure period of 20 minutes, at the end of which the lithium amide source was removed. The resulting rods demonstrated an abraded strength of 28,000 p.s.i., as compared to 20,000 p.s.i for a similar but untreated sample.

EXAMPLE 6

Vapor which is supersaturated at the temperature within the treating zone can be used in accordance with this invention, provided precipitation on the glass surface of any super cooled droplets is avoided. However, as a rule of thumb, higher strengths can be achieved in a given exposure period, with saturated vapor than with supersaturated vapor.

Droplets or specks of the metal compound may become entrained in the vapor leaving the vaporizing zone. This effect is generally more pronounced with lower melting compounds such as CuCl, but occurs with lithium compounds as well. Cooling a vapor which is supersaturated also tends to form such droplets. A significant improvement in strength can be obtained by providing a space or conduit between the vaporizing zone and the treating zone along which the droplets precipitate and are thereby prevented from impinging on the article being treated.

This is demonstrated by a test wherein identical rods were exposed to LiBr in the manner described in Example 4, with the exception that a set of rods was placed closely adjacent the vaporizing zone, where they were specked with droplets of LiBr precipitating therein. The other rods were spaced 21" from the vapor source. The extent of vapor supersaturation, and consequent specking, was most pronounced closest to the vaporizing zone, and condensation and absorption on the furnace walls reduced the amount of supersaturation with increasing distance from the source. The source was at 1400° F., the rods at 1100° F. The rods close to the vapor source were actually weakened, displaying a strength of only 17,200 p.s.i. as compared to the 20,000 p.s.i. strength of untreated rods. In contrast the rods which were 21" from the source displayed an abraded strength of 42,800 p.s.i.

As previously explained, it is desirable to maintain a substantially constant vapor concentration in the treating furnace. Since changes in the level of the material being vaporized in the vapor generating furnace tend to affect the vapor concentration in the treating chamber, I have found it desirable to maintain an essentially constant level (or supply) of the material which is to be vaporized in the vapor generating zone. FIG. 4 of the drawings illustrates a preferred apparatus for this purpose, whereby the particulate material is fed from a hopper by an auger or scew conveyor into the vapor generating furnace. The material is melted as it is conveyed into the vapor generating zone, and an essentially constant level is automatically maintained in the vaporizing zone.

More specifically, a large bin designated by 40 contains a bulk supply of the particulate material 41 which is to be charged to the vapor generating zone. Bin 40 feeds a conveyor belt 42 through a gate 43. The opening of gate 43 is controlled by means 44 which sense the level of material in the smaller hopper 45 fed by the belt 42, so as to maintain a fairly constant level of material in the small hopper 45. It is preferred that both the large hopper 41 and the smaller hopper 45 and the belt 42 be enclosed, as designated diagrammatically at 46, in a chamber in which the temperature and humidity can be controlled to preserve constancy and purity of the material being charged.

The small hopper 45 feeds an auger or screw 50. A level senser at 48 operates a gate 51 of hopper 45 to maintain an essentially constant liquid level 52 in the container 53 in the vaporizing zone 5. Auger 50 is driven by a variable speed motor 54 and conveys material through the insulating housing 55 of the vapor furnace 4 into the crucible 53, or other vessel therein. All or part of the screw auger 50 can be provided with heating means to melt the material being fed in the screw auger, so that it is injected into the crucible 53 in liquid state. Alternatively, the temperature in crucible 53 will melt the material as the material enters the crucible. Auger 50 may have a slight angulation, e.g. 5°, from horizontal to prevent liquified material from flowing upstream, that is, out of the vapor generating furnace and into the screw 50.

While the foregoing examples and embodiments constitute the presently preferred practice of my invention, the invention is by no means limited to those examples alone, but also includes other embodiments and practices falling within the scope and spirit of the claims which follow.

What is claimed is:

1. In the method of chemically strengthening a glass article wherein a surface zone of the article is modified by subjecting the article at elevated temperature to vapor of a glass strengthening compound of the class which supplies a glass interactive metal containing component which diffuses into the surface of the glass and alters the chemical composition of said surface zone such that said surface zone after cooling is in compression relative to the interior of said article, the improvement comprising,
supplying a source of said metal compound to a vaporizing zone spaced from said treating zone,
heating said article in said treating zone to a treating temperature at which said diffusion takes place and said surface zone is chemically modified,
heating said source in said vaporizing zone to a temperature above the surface temperature of said article in said treating zone and sufficiently high to vaporize at least a portion of said metal compound in said vaporizing zone,
introducing vapor from said vaporizing zone into said treating chamber and exposing said article to said vapor in said treating zone while maintaining a lower temperature at the surface of said article than the temperature in said vaporizing zone.

2. The improvement of claim 1 wherein said vapor is conducted from said vaporizing zone to said treating zone through an intermediate zone wherein any particles entrained in said vapor are substantially removed from said vapor by precipitation.

3. The improvement of claim 2 wherein said vapor is cooled in said intermediate zone, but not to a temperature lower than the temperature at the surface of said article.

4. The improvement of claim 1 wherein the temperature in said vaporizing zone is more than about 100° F. higher than the temperature in said treating zone.

5. The improvement of claim 4 wherein the temperature in said vaporizing zone is at least 1200° F.

6. The improvement of claim 1 wherein the temperature at the surface of said article is below the annealing point of said glass, and wherein the temperature in said vaporizing zone is above the annealing point of said glass.

7. The improvement of claim 1 wherein the temperature in said vaporizing zone is above the temperature at which said article would deform.

8. The improvement of claim 1 wherein the atmosphere within said treating zone is substantially saturated with vapor of said metal compound.

9. The improvement of claim 1 wherein the atmosphere within said vaporizing zone is saturated with vapor of said metal compound.

10. The improvement of claim 1 wherein said metal compound is a lithium compound.

11. The improvement of claim 1 wherein said meal compound is a cuprous compound.

12. The improvement of claim 1 wherein the weight of the source of said metal compound is maintained substantially constant in said vaporizing zone.

13. The improvement of claim 1 wherein a portion of the vapor of said metal compound is recirculated from said treating zone to said vaporizing zone.

14. The improvement of claim 1 wherein said vaporizing zone is defined in a separate furnace and is connected to said treating zone by a heated conduit.

(References on following page)

References Cited

UNITED STATES PATENTS

| | | | |
|---|---|---|---|
| 207,077 | 8/1878 | Shirley | 65—30 |
| 2,026,086 | 12/1935 | Farncomb | 65—30 |
| 2,779,136 | 1/1957 | Hood et al. | 65—30 |
| 3,012,902 | 12/1961 | Bayer | 65—30X |
| 3,331,702 | 7/1967 | Dates et al. | 117—106X |
| 3,353,514 | 11/1967 | Lyle | 65—30X |

FOREIGN PATENTS

| | | | |
|---|---|---|---|
| 748,820 | 6/1962 | Canada | 65—30 |

S. LEON BASHORE, Primary Examiner

J. H. HARMAN, Assistant Examiner

U.S. Cl. X.R.

65—32, 60; 117—106, 124; 118—48